(12) United States Patent
Schumacher

(10) Patent No.: US 7,882,736 B2
(45) Date of Patent: Feb. 8, 2011

(54) LEVEL MEASUREMENT USING A PROCESS VESSEL CAGE

(75) Inventor: Mark S. Schumacher, Minneapolis, MN (US)

(73) Assignee: Rosemount Inc., Eden Prairie, MN (US)

( * ) Notice: Subject to any disclaimer, the term of this patent is extended or adjusted under 35 U.S.C. 154(b) by 577 days.

(21) Appl. No.: 11/938,368

(22) Filed: Nov. 12, 2007

(65) Prior Publication Data

US 2009/0120181 A1 May 14, 2009

(51) Int. Cl.
*G01M 13/02* (2006.01)
(52) U.S. Cl. .................................................. 73/292
(58) Field of Classification Search ............... 73/299, 73/292
See application file for complete search history.

(56) References Cited

U.S. PATENT DOCUMENTS

| | | | |
|---|---|---|---|
| 3,130,586 A | 4/1964 | Taylor et al. | |
| 4,993,754 A | 2/1991 | Templin, Jr. | |
| 5,870,695 A * | 2/1999 | Brown et al. | 702/138 |
| 2002/0178822 A1 | 12/2002 | Nelson et al. | |
| 2008/0053242 A1* | 3/2008 | Schumacher | 73/861.42 |

FOREIGN PATENT DOCUMENTS

| | | |
|---|---|---|
| CA | 1201532 | 3/1986 |
| DE | 3713105 A1 | 10/1987 |

OTHER PUBLICATIONS

International Search Report and Written Opinion for international application No. PCT/US2008/012679, dated Feb. 13, 2009.
FIELDVUE Digital Level Controllers, Product Flier PF11. 2:DLC3000, Fisher Controls International, Inc., Apr. 2001.
Type DL3 Digital Level Transmitter, Product Bulletin 11.2:DL3, Fisher Controls International, May 2006.
Scalable Pressure, Flow, and Level Solutions, Rosemount 3051S Series, Product Data Sheet 00813-0100-4801, Rev GA, 2006-2007.
Official Communication from European patent application No. 08850438.6 dated Jul. 1, 2010.

* cited by examiner

*Primary Examiner*—Hezron Williams
*Assistant Examiner*—Tamiko D Bellamy
(74) *Attorney, Agent, or Firm*—Christopher R. Christenson; Westman, Champlin & Kelly, P.A.

(57) ABSTRACT

A process fluid level measurement system is configured to measure a level of at least one process fluid in a vessel. The vessel has a cage with at least one annular isolator located inside the cage. The at least one annular isolator has a band-shaped isolator diaphragm. A differential pressure transmitter is operably coupled to the annular isolators) and is configured to generate a level output based, at least in part, upon pressure measured relative to the annular isolator(s).

9 Claims, 4 Drawing Sheets

LEVEL MEASUREMENT USING A PROCESS VESSEL CAGE

BACKGROUND OF THE INVENTION

Process fluid level and interface measurements are extremely important in fluid processing installations. Such measurements provide knowledge regarding the amount of fluid remaining in a container or vessel. Additionally, interface measurements can provide important information regarding level(s) at which two or more dissimilar fluids interface. Since level and interface measurements are vitally important to any process installation where knowledge regarding the amount of process fluid remaining is important, such applications are widespread.

Cage guided or bridle mounted level systems are commonly used for level and interface measurement on large process vessels, such as chemical and refinery reactors. A bridle, or cage, is simply a small vessel or conduit that is mounted off of the large vessel and coupled to the large vessel via conduits. The fluid level, and/or interface levels within the cage or bridle are directly representative of such conditions within the larger vessel. However, it is often easier to measure characteristics of the fluids within the cage or bridle. Further, it is known to provide valves to allow the cage or bridle to be fluidically isolated from the larger vessel when maintenance operations need to be performed.

In typical instrument applications, a displacer or "float" is mounted inside the bridle. The buoyancy of the float is translated through the pressure wall via a torque tube and hence into a level transmitter that converts the torque tube force into a pneumatic, analog or digital signal for output. One example of a commercially available digital level transmitter utilizing this approach is sold under the trade designation Type DL3 Digital Level Transmitter, available from Fisher Controls International of Marshalltown, Iowa.

Another type of cage guided or bridle mounted level system utilizes guided wave radar or capacitance-based measurement devices. Typically, the radar waves are guided down through the process liquid in the cage via a waveguide. As the microwave energy reaches an interface, such as the upper level of the process fluid, or an interface between two fluids, a reflection is caused that propagates back along the waveguide to the transmitter. Information about the echo can be used to calculate the level(s) of fluids within the cage. One difficulty encountered by radar-based level measurement techniques is that it is sometimes difficult and/or costly to form a proper seal that, while containing the pressure of the vessel, can still pass the radar signals effectively. For example, it is not uncommon for such vessels to be operating at pressures of several hundred pounds per square inch.

SUMMARY OF THE INVENTION

A process fluid level measurement system is configured to measure a level of at least one process fluid in a vessel. The vessel has a cage with at least one annular isolator located inside the cage. The at least one annular isolator has a band-shaped isolator diaphragm. A differential pressure transmitter is operably coupled to the annular isolator(s) and is configured to generate a level output based, at least in part, upon pressure measured relative to the annular isolators).

DETAILED DESCRIPTION OF ILLUSTRATIVE EMBODIMENTS

Figure 1:
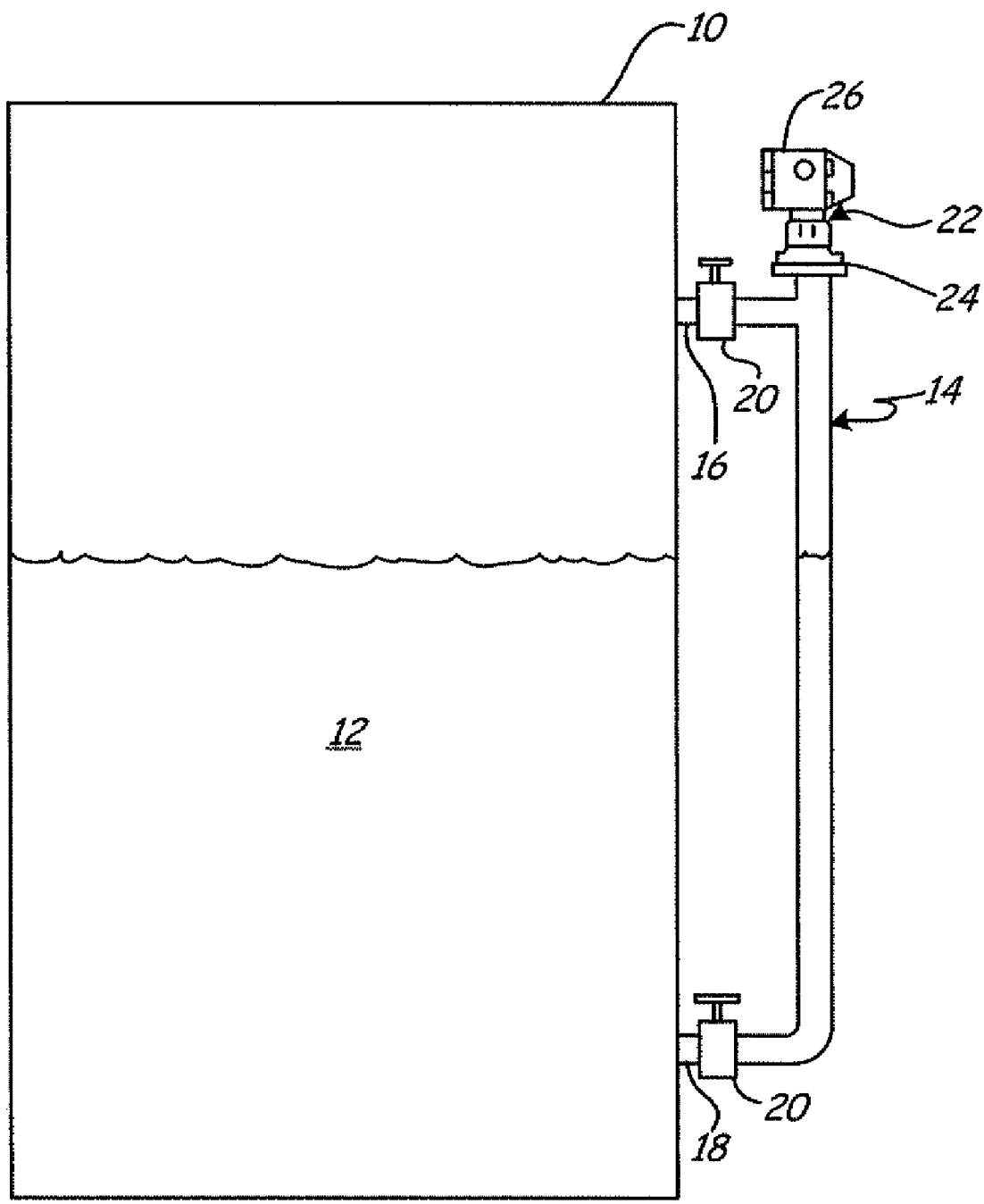
FIG. 1 is a diagrammatic view of a process fluid level/interface measurement system in accordance with an embodiment of the present invention.

FIG. 1 is a diagrammatic view of a process fluid level/interface measurement system in accordance with an embodiment of the present invention. Process fluid vessel 10 contains process fluid 12. While FIG. 1 shows process fluid 12 as a single homogeneous substance, it may, in fact, comprise multiple layers of distinct process fluids. Cage 14 is coupled to process fluid vessel 10 via upper and lower couplings 16, 18, respectively. As illustrated in FIG. 1, each of couplings 16, 18, is also preferably coupled to a valve 20 to allow selectable isolation of cage 14 from vessel 10. In accordance with an embodiment of the present invention, differential pressure transmitter 22 is mounted atop flange 24 of cage 14. Differential pressure transmitter 22 can be any suitable differential pressure transmitter capable of providing an output based upon a differential pressure between a pair of inputs. Examples of suitable differential pressure transmitters include that sold under the trade designation Model 3051S, available from Rosemount Inc., of Chanhassen, Minn. Transmitter 22 can include housing 26, which housing 26 may simply provide basic field wiring termination in the form of a junction box. However, housing 26 may also include suitable advanced electronics to provide a local display and/or operator interface for differential pressure transmitter 22. Further, housing 26 may also provide advanced PlantWeb® functionality with Highway Addressable Remote Transducer (HART®) or FOUNDATION® Fieldbus communication. Further still, housing 26 may also provide advanced electronics that facilitate web-based monitoring and/or additional power generation/storage. Finally, housing 26 may also provide a wireless interface for differential pressure transmitter 22 to communicate with other devices via wireless communication.

Transmitter 22 is considered a process device, or field device, in the sense that it is generally located in the field. Process vessels are located outdoors and it is desirable for transmitter 22 to have close physical proximity to vessel 10. Field devices are often subjected to temperature extremes, vibration, corrosion and/or flammable environments, as well electrical noise. In order to withstand such conditions, field devices are specifically designed for field-mounting. Such field-mounted devices utilize robust enclosures, which can be designed to be explosion-proof. Further, field devices can also be designed with circuitry that is said to be "intrinsically safe," which means that even under fault conditions, the circuitry will generally not contain enough electrical energy to generate a spark. Further still, electrical isolation techniques are usually employed to reduce the effects of electrical noise. These are just a few examples of the design considerations, which distinguish field devices from other electrical devices, which measure or sense differential pressure.

Aside from the environmental considerations listed above, another challenge for field devices is that of wiring. Since field devices are often located near the process, and far from the control room, long wire runs may sometimes be necessary to couple such devices to the control room. These long wire runs are costly to install and difficult to maintain. One way to reduce the requisite wiring is by using two-wire field devices. These devices couple to the control room using a two-wire process control loop. Two-wire devices receive power from the process control loop, and communicate over the process control loop in a manner that is generally unaffected by the provision of power to the field device. Techniques for communicating over two-wires include 4-20 mA signaling, the HART® protocol, FOUNDATION™ Fieldbus, and others.

Figure 2:
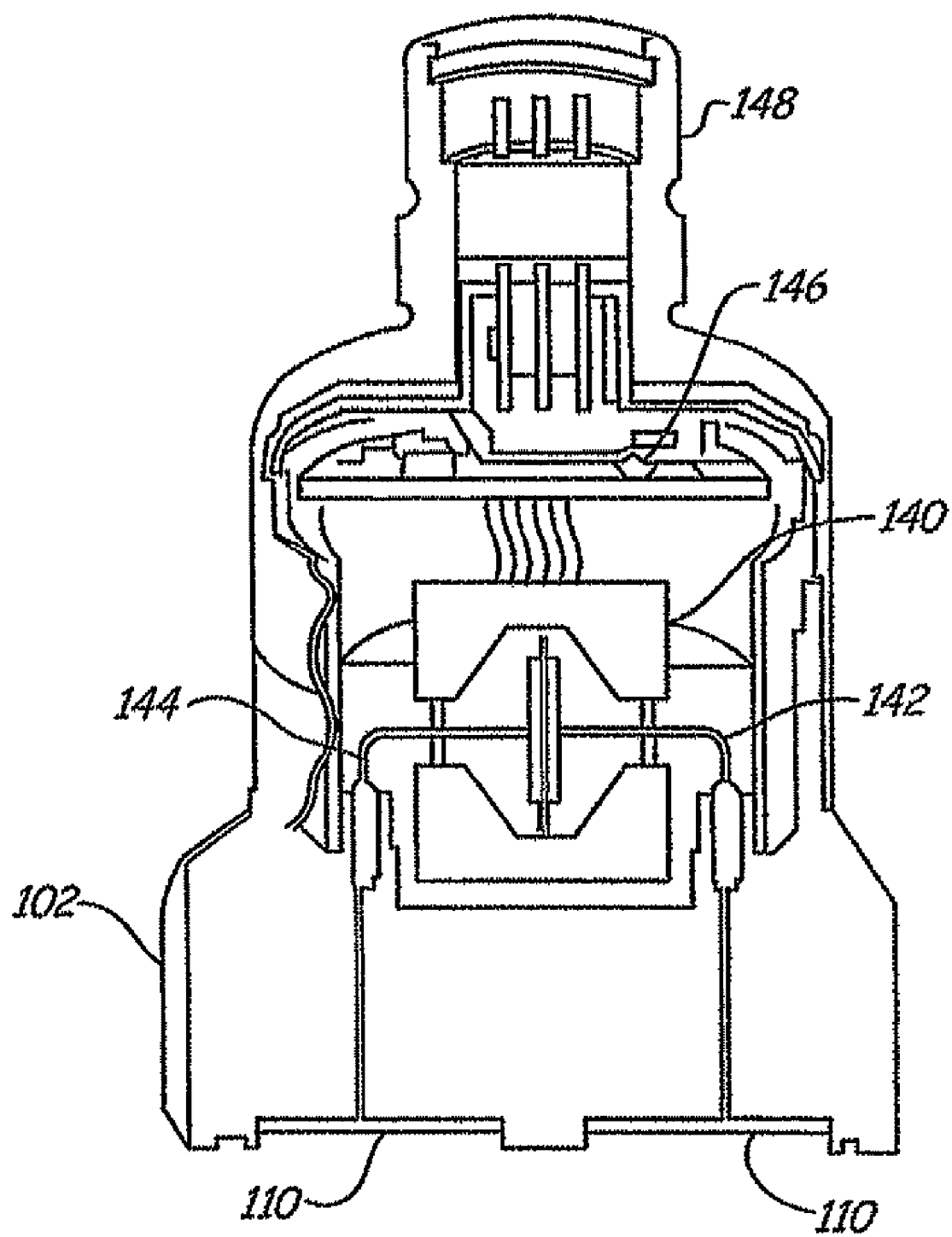
FIG. 2 is a cross-sectional view of pressure sensor module of differential pressure transmitter useful with embodiments of the present invention.

FIG. 2 is a cross-sectional view of pressure sensor module 102 of differential pressure transmitter 22. Differential pressure sensor 140 is located inside module housing 102 and connects, by tubes 142, 144 to isolator diaphragms 110. Isolator diaphragms 110 are welded directly to module housing 102. Circuit board 146 provides circuitry associated with processing electrical signals from differential pressure sensor 140. Connector 148 provides electrical connections from circuit board 146 to circuitry or wiring in electronics housing 26. Housing 102 is considered a co-planar pressure sensor module in that isolator diaphragms 110 are substantially co-planar with one another. Pressure sensor module 102 is generally indicative of a relatively new standard in pressure sensing. In particular, pressure sensor module 102 is illustrative of a co-planar pressure sensor module sold under the trade designation Model 3051S available from Rosemount Inc., of Chanhassen, Minn. This sensor module is highly adaptable and can be used in a variety of applications due to its adaptability and its modularity. However, embodiments of the present invention are practicable with any suitable differential pressure sensor module.

Figure 3:
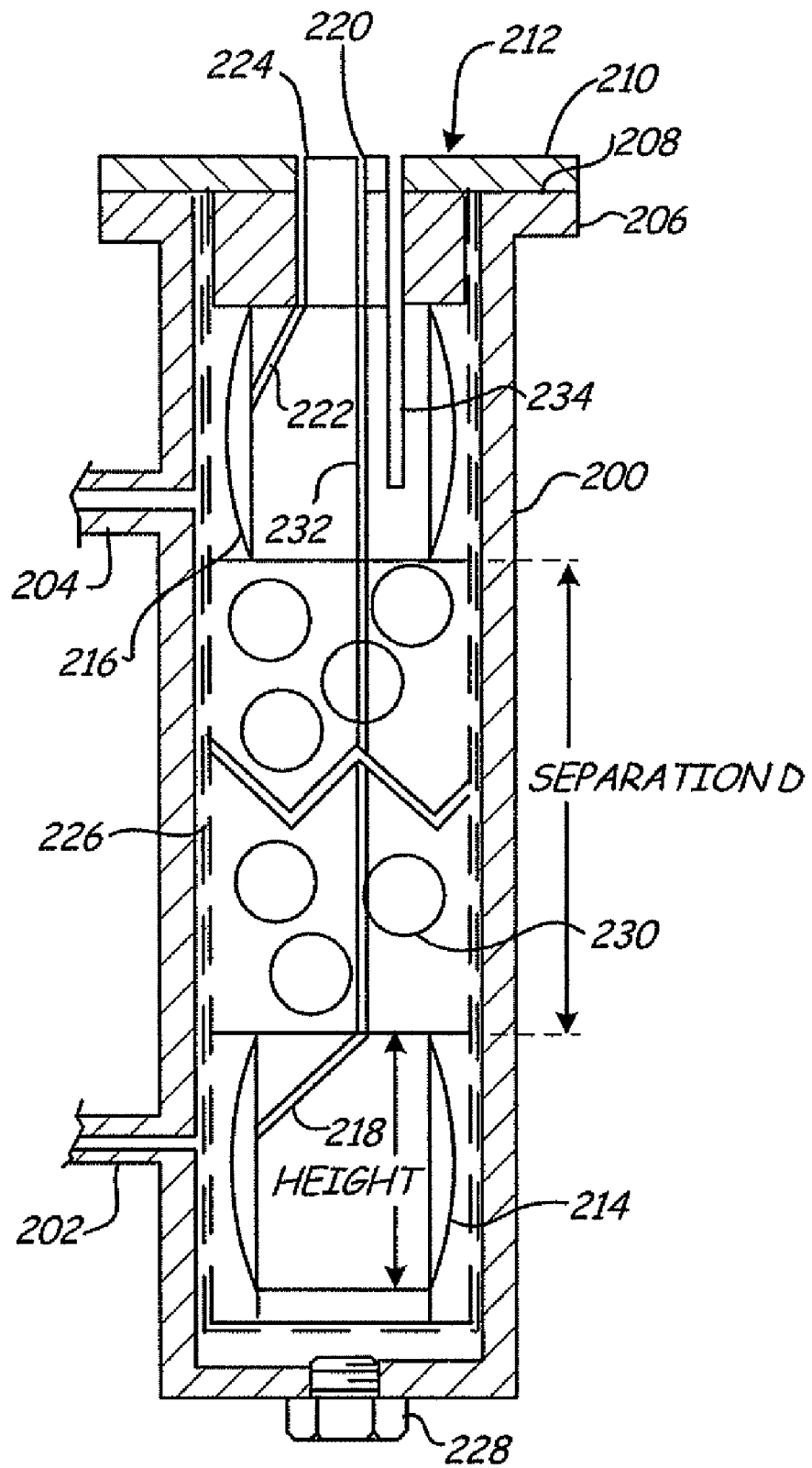
FIG. 3 is a cross-sectional view of a dual remote seal oil filled system with annular diaphragms disposed within a cage in accordance with an embodiment of the present invention.

FIG. 3 is a cross-sectional view of a dual remote seal oil filled system with annular diaphragms disposed within a cage in accordance with an embodiment of the present invention. Cage 200 includes a pair of nozzles 202, 204, which are coupleable to a process vessel (not shown in FIG. 3). Cage 200 includes cage flange 206, which provides an upwardly facing surface 208, which surface 208 couples with dual remote seal flange 210. Dual remote seal system 212 includes a pair of annular isolator diaphragms 214, 216 disposed proximate nozzles 202, 204, respectively. Typically, isolator diaphragms are generally planar and shaped circularly. However, annular isolator diaphragms 214 and 216 are formed of a thin layer of deformable material in the shape of a band that encircles a drum-shaped substrate. Thus, while the area of a traditional isolator diaphragm is equal to $\pi r^2$, the area of the annular isolator diaphragm is roughly equal to $\pi \times$(diameter of drum)$\times$(height of the band). Accordingly, within the confined space of a cage, annular isolator diaphragms 214, 216, provide vastly increased surface area over traditional planar, circular, isolator diaphragms. This increased surface area provides improved precision, accuracy, and stability, in the measurement of pressure related to the level of process fluids within vessel 10. The two annular isolation diaphragms 214, 216 are separated by a known distance indicated in FIG. 3 as separation D. By fixing the distance between isolator diaphragms 214, 216 at a known value, interface level may be derived via standard remote seal measurement techniques. For example, (Ph–Pl)/d=density. If the density of both products is known, the differential pressure output (Ph–Pl) from transmitter 22 can be scaled to represent interface level. As illustrated in FIG. 3, assembly 212 can simply be inserted into cage 200 from the top.

The pressure of fluid proximate nozzle 202 is conveyed by annular isolation diaphragm 214 into isolation fluid within fluid passageway 218 which passageway 218 ultimately conveys fill fluid to aperture 220. Similarly, pressure exerted upon annular isolation diaphragm 216 via fluid proximate nozzle 204 is conveyed via passageway 222 to aperture 224. Apertures 220 and 224 are positioned to align relatively with isolation diaphragms 110 illustrated with respect to FIG. 2. In order to guard assembly 212 against mechanical perturbations either during operation, or while assembly 212 is being installed in cage 200, assembly 200 preferably includes a protection tube 226. Protection tube 226 extends from a region proximate first annular isolator diaphragm 216 to a bottom region proximate drain plug 228. Preferably, protector tube 226 includes a number of apertures, illustrated in FIG. 3 as holes, that allow process fluid to flow therethrough. While FIG. 3 illustrates apertures 230 as holes, any suitable shapes, including slots, can be used.

In accordance with an embodiment of the present invention, system 212 preferably includes thermowell 234 which is sized to accept a standard temperature probe, such as an RTD or a thermocouple. The temperature sensor disposed in the thermowell can be coupled to a suitable multi-variable type pressure transmitter to provide vessel pressure, temperature and interface level, using a single instrument.

As described above, if the density of both products in a multi-fluid system are known, the differential pressure output from the transmitter can be scaled to represent the interface level. Given that different fluids have different densities, and that different applications will generally have cages of different sizes, in accordance with one embodiment of the present invention, protector tube 226 and lower isolator 214 are separable from upper isolator 216, and flange 210. Once a specific application has been identified, a suitably sized protection tube 226 can be selected, or otherwise created, and coupled to lower isolator diaphragm 214. Additionally, a suitable length of fill fluid conduit can be used to couple fluid passageway 218 to fluid passageway 232 of upper isolator 216.

Figure 4:
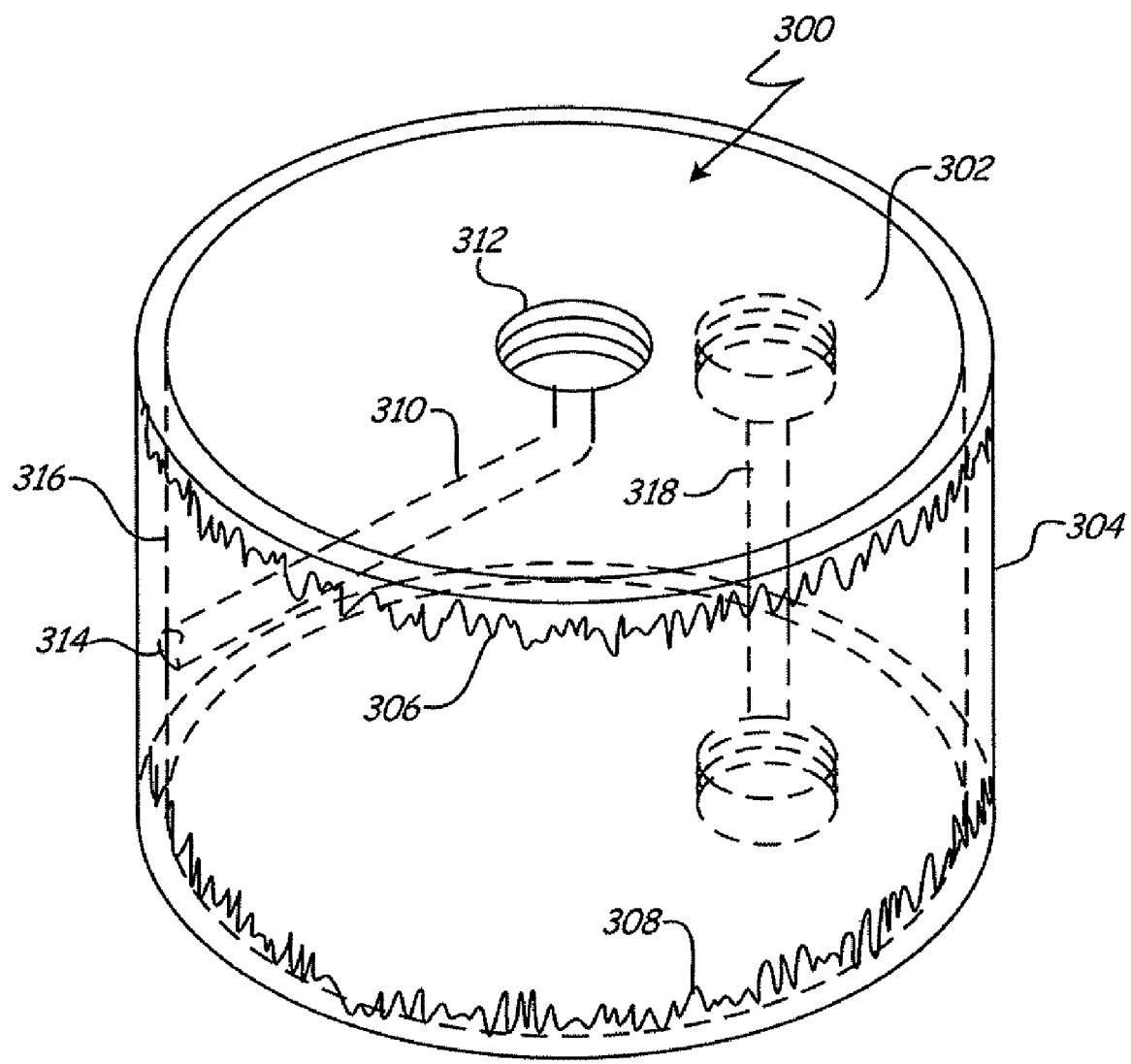
FIG. 4 is a perspective view of an annular isolation diaphragm in accordance with an embodiment of the present invention.

FIG. 4 is a perspective view of an annular isolation diaphragm 300 in accordance with an embodiment of the present invention. Diaphragm 300 includes a substantially solid inner core or drum 302 about which a band of deflectable diaphragm materiel 304 is welded along circumferential edges 306, 308. Fill fluid passageway 310 extends from inlet port 312 to aperture 314 proximate band 304. While it is preferred that the sidewall 316 of core 302 be substantially flat to minimize internal oil volume, it is expressly contemplated that suitable shapes, such as a concave or convex shapes can be machined, or otherwise formed, into sidewall 316. If annular isolator diaphragm 300 were an upper isolator diaphragm, second passageway 318 (shown in phantom) passing vertically through core 302 would be utilized to pass fill fluid from the lower isolator diaphragm. However, if annular isolator diaphragm 300 is a lower diaphragm, then second passageway 318 is not used, and may be plugged. Accordingly, it is contemplated that manufacture of such annular diaphragms can be standardized by creating such a vertical passageway in all isolation diaphragms, but only using them in the top diaphragm.

Embodiments of the present invention provide a number of advantages. Specifically, the mechanical configuration allows direct retrofitting of displacer-type instruments. Additionally, the utilization of a standard pressure transmitter allows for economies of scale. Further, remote seal technology is proven, and is able to withstand relatively high pressures within the vessel. Further still, the external annular seal shape provides a significantly increased diaphragm area while maintaining tube-shaped packaging. Further still, embodiments of the present invention generally accommodate design variations relative to the distance between the diaphragm assemblies.

Although the present invention has been described with reference to preferred embodiments, workers skilled in the art will recognize that changes may be made in form and detail without departing from the spirit and scope of the invention.

What is claimed is:

1. A process fluid level measurement system configured to measure a level of at least one process fluid in a vessel, the vessel having a cage mounted thereto, the system comprising:
   at least one annular isolator configured to be disposed within the cage, the at least one annular isolator having a band-shaped isolator diaphragm; and
   a differential pressure transmitter operably coupled to the at least one annular isolator, the transmitter being configured to generate a level output based at least in part, upon pressure measured relative to the at least one annular isolator.

2. The system of claim 1, wherein the at least one annular isolator comprises a pair of annular isolators, each annular isolator being coupled to respective ports of the differential pressure transmitter.

3. The system of claim 2, wherein the pair of annular isolators are separated from one another by a known distance, and wherein the differential pressure transmitter uses the known distance to calculate the level output.

4. The system of claim 1, wherein the level output is indicative of an interface between two process fluids in the cage.

5. The system of claim 1, and further comprising a protective tube disposed about the annular isolators within the cage.

6. The system of claim 5, wherein the protective tube includes a number of apertures.

7. The system of claim 1, and further comprising a thermowell configured to receive a temperature sensor, and wherein the differential pressure transmitter is configured to provide a temperature output based upon a characteristic of the temperature sensor.

8. The system of claim 1, wherein the differential pressure transmitter is mounted atop the cage.

9. The system of claim 1, wherein the band-shaped isolator diaphragm is welded to a drum-like core by a pair of circumferential welds.

\* \* \* \* \*